United States Patent
Orlady

(10) Patent No.: US 7,722,516 B2
(45) Date of Patent: May 25, 2010

(54) COLD ROLLING PIN SYSTEM

(76) Inventor: Christopher Orlady, 1094 Flume Rd., Incline Village, NV (US) 89451

(*) Notice: Subject to any disclaimer, the term of this patent is extended or adjusted under 35 U.S.C. 154(b) by 1141 days.

(21) Appl. No.: 11/351,602

(22) Filed: Feb. 10, 2006

(65) Prior Publication Data

US 2007/0191200 A1     Aug. 16, 2007

(51) Int. Cl.
*A21C 3/02*     (2006.01)
(52) U.S. Cl. ............... 492/14; 492/13; 492/46; 492/49; 492/54; 492/56
(58) Field of Classification Search ............ 492/54, 492/56, 46, 13, 14, 53, 49
See application file for complete search history.

(56) References Cited

U.S. PATENT DOCUMENTS

| | | | |
|---|---|---|---|
| 159,643 A | 2/1875 | Cavalier | |
| 220,702 A | 10/1879 | Cromer | |
| 857,308 A | 6/1907 | Sanford | |
| 950,775 A | 3/1910 | Vick | |
| 1,325,260 A | 12/1919 | Morris | |
| 1,603,683 A | 10/1926 | Gale | |
| 2,208,729 A | 7/1940 | Offutt | |
| 2,673,532 A | 3/1954 | Stair | |
| 2,683,428 A | 7/1954 | Neal | |
| 2,721,524 A | 10/1955 | Osborn | |
| 3,653,338 A | 4/1972 | Sauey | |
| 6,402,673 B1 * | 6/2002 | Cyzycki et al. | 492/47 |
| 6,585,629 B2 | 7/2003 | Jerstrom et al. | |
| 6,799,511 B2 * | 10/2004 | McLean et al. | 101/375 |
| 2005/0176565 A1 | 8/2005 | Dua et al. | |

* cited by examiner

*Primary Examiner*—David P Bryant
*Assistant Examiner*—Sarang Afzali
(74) *Attorney, Agent, or Firm*—Lewis and Roca LLP

(57) ABSTRACT

A metal rolling pin system includes a metal rolling pin formed from a cylindrical metal body having a hollow core. A removable cylinder is disposed inside the core and is filled with a freezable material such as a cellulose gel material. The rolling pin may also have insulating material inside the core to prevent condensation. A silicone sleeve fits over the metal outside of the pin to keep the dough or pastry from sticking. The rolling pin system has more than one core to assure that there is always a frozen core to keep the pin and dough cold.

9 Claims, 1 Drawing Sheet

COLD ROLLING PIN SYSTEM

BACKGROUND OF THE INVENTION

1. Field of the Invention

The present invention relates to cooking and baking utensils. More particularly, the present invention relates to rolling pins and to a cold rolling pin system.

2. The Prior Art

If dough is not kept chilled enough when it is being rolled out, it has a tendency to stick to the rolling pin because it gets too soft. As a result, the dough can tear, pastry is difficult to work with and does not always turn out well.

Various solutions have been proposed to alleviate this problem. U.S. Pat. No. 159,643 to Cavalier discloses a hollow rolling pin formed from glass that may be filled with hot or cold water to increase or decrease the temperature of the dough being rolled.

U.S. Pat. No. 220,702 to Cromer discloses a hollow rolling pin formed from glass and having thicker walls at the end portions. The hollow rolling pin may be filled with ice or cold water to decrease the temperature of the dough being rolled or with hot water to increase the temperature of the dough being rolled.

U.S. Pat. No. 857,308 to Sanford also discloses a hollow rolling pin formed from glass that may be filled with ice water to decrease the temperature of the dough being rolled.

U.S. Pat. No. 950,775 to Vick also discloses a hollow rolling pin formed from glass that may be filled with ice to decrease the temperature of the dough being rolled.

U.S. Pat. No. 1,325,260 to Morris discloses a hollow rolling pin formed from glass that may be filled with a cool liquid to decrease the temperature of the dough being rolled.

U.S. Pat. No. 2,208,729 to Offutt discloses a hollow rolling pin formed from glass that may be filled with water and placed into a freezer to form ice to decrease the temperature of the dough being rolled. An air trap is provided to prevent the expansion of the ice from damaging the structure.

U.S. Pat. No. 2,683,428 to Neal discloses a rolling pin having a plastic tube affixed to the outside surface to prevent dough from sticking to it while in use.

U.S. Pat. No. 2,673,532 to Stair discloses a rolling pin having a flour-containing cavity so that flour may be dispensed onto the dough from time to time.

U.S. Pat. No. 2,721,524 to Osborn discloses a hollow rolling pi formed from a material such as aluminum that may be filled with ice, dry ice, cold water, or both ice and water to decrease the temperature of the dough being rolled. The patent discloses placing the rolling pin in a refrigerator to cool it down.

U.S. Pat. No. 3,653,338 to Sauey discloses a freezable gel sealed inside a hollow rolling pin formed from polyethylene to decrease the temperature of the dough being rolled. The gel is sealed inside the rolling pin for long periods of time.

United States Patent Publication No. US 2005/0176565 A1 by Dua et al. discloses a rolling pin having a layer of silicone material at the surface to prevent the dough being rolled from sticking to the rolling pin.

BRIEF DESCRIPTION OF THE INVENTION

A metal rolling pin system includes a rolling pin formed from a cylindrical metal body having a hollow core. An easily removable cylinder is disposed inside the core and is filled with a material such as a freezable cellulose gel. The rolling pin may also have a layer of insulating material disposed in between the core and the removable cylinder to prevent condensation. A sleeve formed from a non-stick material such as silicone may be provided over the outside of the pin to keep the dough or pastry from sticking to the rolling pin. The rolling pin is provided with more than one core to assure that there is always a frozen core to keep the pin and dough cold.

BRIEF DESCRIPTION OF THE DRAWING FIGURES

DETAILED DESCRIPTION OF THE INVENTION

Persons of ordinary skill in the art will realize that the following description of the present invention is illustrative only and not in any way limiting. Other embodiments of the invention will readily suggest themselves to such skilled persons.

Figure 1:
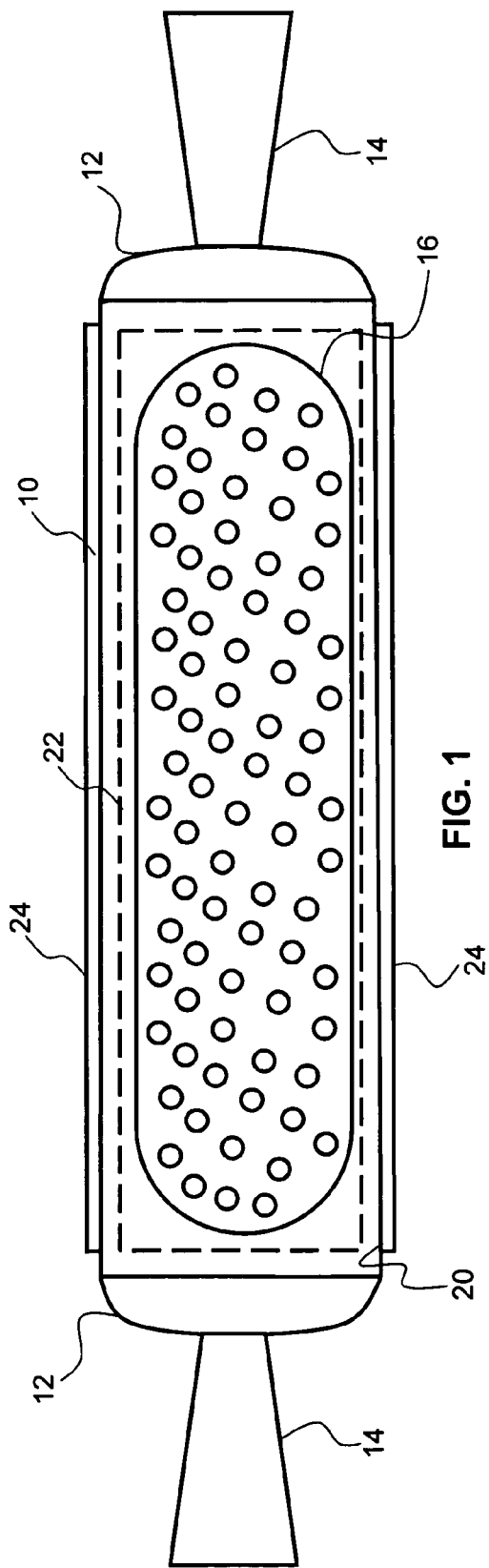
FIG. 1 is diagram showing a cross-sectional view of an illustrative rolling pin according to the present invention.
Figure 3:
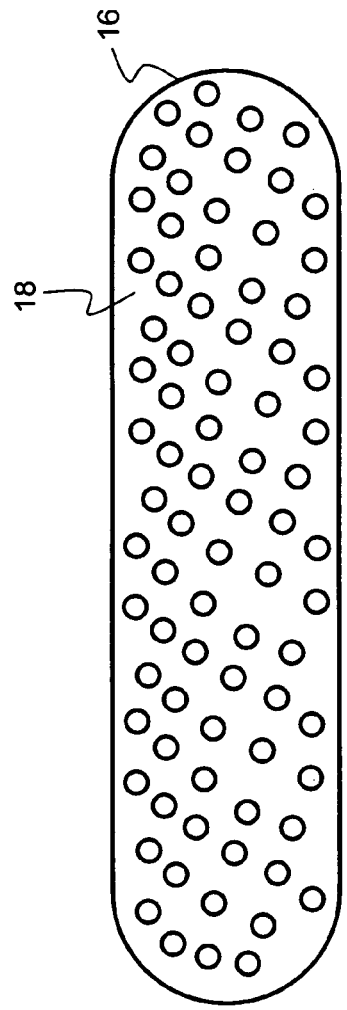
FIG. 3 is a diagram showing a removable cylinder suitable for use in the present invention.
Figure 2:
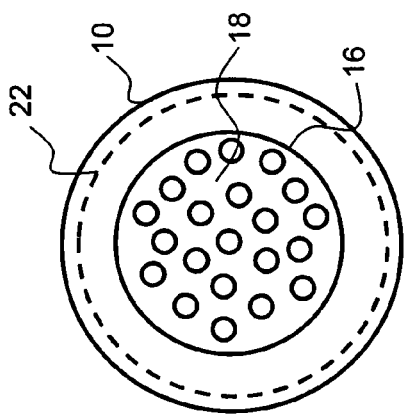
FIG. 2 is a diagram showing an end view of the rolling pin of FIG. 1.

Referring first to FIG. 1, a metal rolling pin system according to the present invention includes a cylindrical metal rolling pin 10 configured as a hollow cylinder and may be formed from materials such as stainless steel, aluminum, or other metals. End caps 12 are provided at the ends of the cylinder. At least one of the end caps 12 is removable and may be fastened to the end of the cylinder by the use of threads, twist-lock interconnections or other known techniques that allow for rapid removal and replacement of the end cap 12. Such techniques shall be referred to herein as quick-connect techniques.

As is known in the art, handles 14 may be provided extending from the end caps 12 or could be integral with the end caps 12. The handles 14 may be formed from a variety of materials, such as wood, plastic, or metal as is known in the art. There are some rolling pins that do not include handles 14. Embodiments of the present invention without handles are contemplated.

A removable cylinder 16 is disposed inside the core. The removable cylinder 16 may be formed from a material such as a plastic material. The removable cylinder 16 is filled with a material such as a freezable cellulose gel, shown at reference numeral 18. According to the present invention, more than one removable cylinder 16 is provided with the rolling pin system of the present invention so that one removable cylinder 16 can be in use while the other is cooling in a freezer. The removable cylinders 16 can be switched when the one in use becomes too warm. The fit between the outside of the removable cylinder 16 and the inside wall 20 of the cylindrical metal rolling pin 10 should be snug to promote thermal transfer.

A layer of insulating material shown at dashed lines 22 may optionally by disposed between the inside wall of cylindrical metal rolling pin 10 and the outside of the removable cylinder 16 to prevent condensation and to help keep the rolling pin 10 cold for a longer period of time. Insulation such as sold by California Innovations under the trade name Therma-Flect® is satisfactory for use in the present invention. Such insulation, as well as the other parts of the rolling pin system, should preferably be impregnated with a food-safe antimicrobial product such as the one sold under the trade name Microban to inhibit growth of bacteria, yeast, mold and odor.

A sleeve 24 formed from a non-stick material such as silicone may be provided over the outside of the metal cylinder 10 of the rolling pin to keep the dough or pastry from sticking. If silicone is used it should be made with a "filler" added to it in order to improve its thermal conductivity. Crushed sea shells are known to have been used as a filler in silicone material to improve its thermal conductivity characteristics.

The rolling pin system of the present invention includes more than one removable cylinder 16 to assure that there is always a chilled removable cylinder 16 to keep the pin and dough cold. When the removable cylinder 16 in use becomes too warm, it is removed and replaced with a chilled removable cylinder.

The present invention will be especially useful to pastry chefs, caterers, chefs, and other people who like to do a lot of baking. The present invention provides several advantages. Dough does not get warm and thus does not stick to the rolling pin and can be rolled faster because it will not stick or tear. It is faster to clean because it is non-stick. Dough tastes better because extra flour does not have to be added. Rolling does not take as much energy because the rolling pin glides over the dough. Dough will stay flakier because the butter stays cold and does not melt into the dough. The frozen core keeps rolling pin cooler longer than the metal pins that are put in a freezer to chill.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A rolling pin system including:
   a cylindrical metal body having a hollow core;
   a removable cylinder disposed inside the core and filled with a freezable material;
   end caps disposed at each end of the cylindrical metal body, at least one end cap being quick-connect fastened to the cylindrical metal body; and
   a sleeve formed from a non-stick material disposed over the outside surface of the metal body.

2. The rolling pin system of claim 1 wherein the freezable material is a freezable cellulose gel.

3. The rolling pin system of claim 1 wherein the cylindrical metal body is formed from aluminum.

4. The rolling pin system of claim 1 further including handles axially disposed at the ends of the cylindrical metal body.

5. The rolling pin system of claim 1 wherein the non-stick material is formed from silicone.

6. The rolling pin system of claim 1 further including a layer of insulating material disposed between the cylindrical metal body and the removable cylinder.

7. The rolling pin system of claim 1 wherein at least one of the end caps is fastened to the cylindrical metal body with mating threads.

8. The rolling pin system of claim 1 wherein at least one of the end caps is fastened to the cylindrical metal body with a twist-lock fitting.

9. The rolling pin system of claim 1 wherein the removable cylinder is disposed inside the core with a snug fit.

\* \* \* \* \*